Oct. 12, 1926.
L. M. WOOLSON
1,602,737
HYDROCARBON MOTOR
Filed Oct. 2, 1919
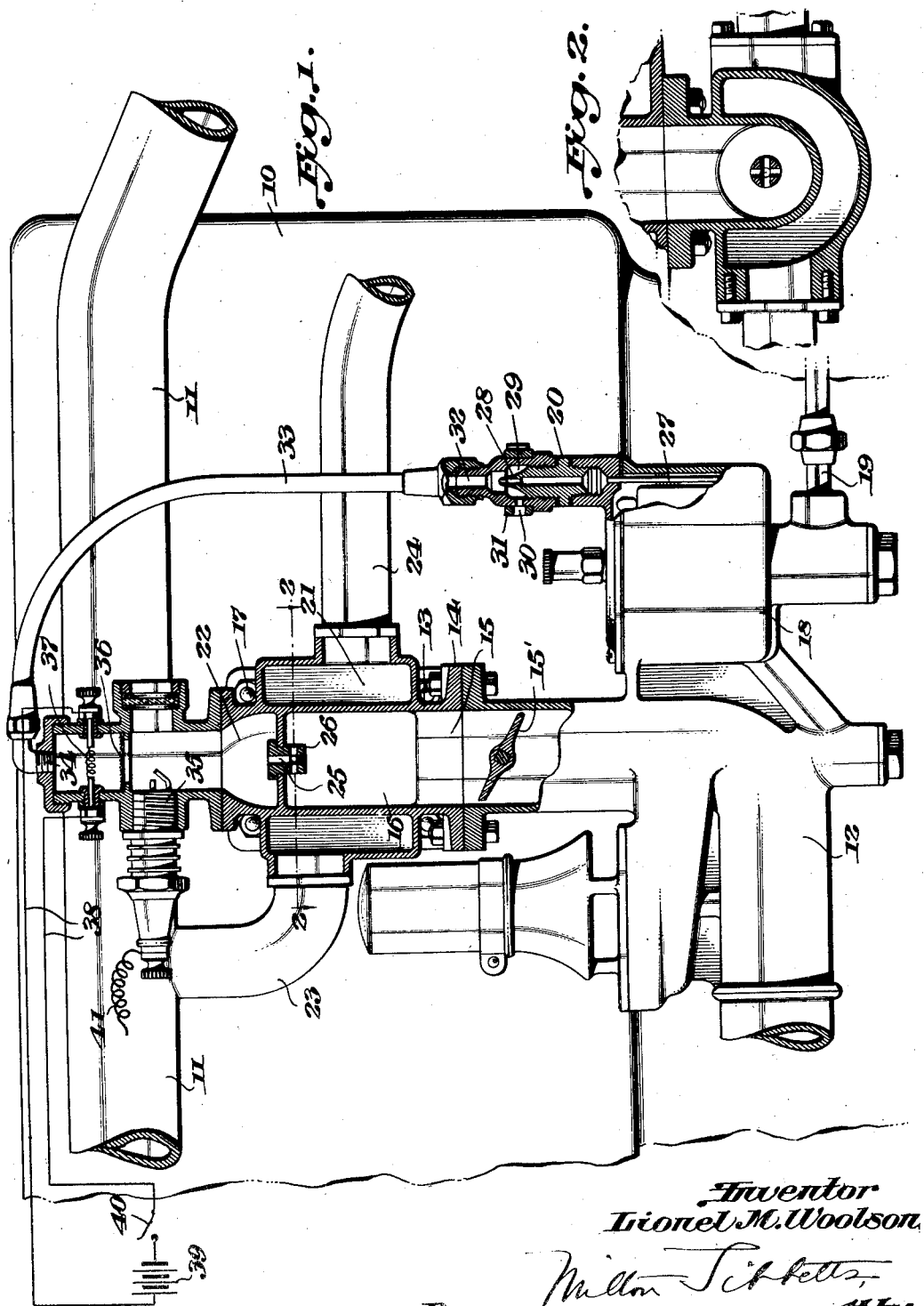
Inventor
Lionel M. Woolson
By Milton Tibbetts,
Atty.

Patented Oct. 12, 1926.

1,602,737

UNITED STATES PATENT OFFICE.

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN.

HYDROCARBON MOTOR.

Application filed October 2, 1919. Serial No. 328,023.

This invention relates to hydrocarbon motors and particularly to means for heating the mixture passing to the motor.

One of the objects of the present invention is to provide heating means for the combustible mixture passing to the motor so that the motor may be easily started and so that the mixture may be delivered to the motor in heated condition throughout the running period of the motor.

Another object of the invention is to provide two separate means for heating the mixture passing to the motor, one of which means may be controlled by the depression in the intake header or manifold.

Another object of the invention is to provide a motor intake pipe with two separate heating jackets, one of which may be supplied with heat from the motor exhaust and the other of which may produce heat for the intake pipe by the combustion of gas within itself.

Another object of the invention is to provide two separate means for heating the mixture passing to the motor, one of which means comprises a heating jacket in communication with the interior of the motor intake pipe.

Another object of the invention is to provide a combustion heater with means for preheating the combustible mixture.

Another object of the invention is to provide a heater device having electric heating means for the mixture therein.

Other objects of the invention will appear from the following description taken in connection with the drawings which form a part of this specification and in which:

Figure 1 is a side elevation of motor parts embodying my invention, portions being shown in section to more clearly illustrate the invention; and Figure 2 is a transverse section on the line 2—2 of Figure 1.

Referring to the drawings, 10 represents a motor cylinder casting which may comprise one or more cylinders, and 11 is an exhaust pipe connected to the motor and forming a conduit for the exhaust gases passing from the cylinders.

12 is a carburetor which may be of any suitable type and 13 is the motor intake pipe or header which is connected to the carburetor as by the flanged connection 14. The upper part of the carburetor and the header 13 form a passage 15 for the mixture passing from the carburetor to the motor. The outlet to that passage is shown at 16 where it enters the motor cylinder block, suitable passages being provided in said block to lead the mixture to the intake ports. The header 13 is suitably secured to the cylinder block as by bolts 17. The passage 15 is controlled by a throttle valve 15' which may be operated either by hand or by a governor device.

The carburetor 12 is supplied with liquid fuel at a predetermined level by a float chamber 18 of usual construction and a supply pipe 19. The float chamber 18 also supplies liquid fuel to a second carburetor 20 hereinafter more fully described.

The intake pipe 13 is formed with surrounding chambers or jackets 21 and 22, which jackets, because of their close relation to the intake header, are adapted to supply heat thereto directly through the walls of the header.

The chamber or jacket 21 is supplied with hot gas from the exhaust pipe 11 through a pipe 23 which thereby bypasses some of the exhaust gas to the chamber 21. An outlet pipe 24 is provided for carrying off this bypassed exhaust gas.

The chamber or jacket 22 may be known as a combustion chamber because it is adapted to receive mixture from the carburetor 20 above referred to and burn the mixture in the chamber 22 for the purpose of supplying heat to the passage 15. Also the burned and expanded gases from the chamber 22 pass into the passage 15 to thereby further heat the mixture passing from the main carburetor 12 to the motor, an opening 25 being provided for this purpose. Said opening 25 is formed in a plug 26 having longitudinal and transverse passages as shown to distribute the burnt gas as it enters the passage 15.

The carburetor 20 hereinabove generally referred to has a pipe leading into the float chamber 18 so that it may draw liquid fuel therefrom. This fuel is drawn upwardly through a nozzle 28 having a surrounding air space 29 supplied with air through one or more ports 30, said port 30 being adjustable as to size by a sleeve 31. The outlet 32 of this carburetor connects with a pipe 33 which carries the mixture to the chamber 22, the other end of the pipe being connected with the top of said chamber 22 as at 34.

In the chamber 22 is a spark plug 35 or other igniter and between the connection 34 of the pipe 33 and said spark plug 35 is a screen 36 or other device for breaking up the mixture which is supplied to the chamber. For the purpose of also heating this mixture before it reaches the igniter 35 an electric heating coil 37 is provided in the chamber 22, preferably between the connection 34 and the screen 36. Thus the mixture from the carburetor 20 is preheated before it is ignited in the chamber 22.

The electrical connections for the heating coil 37 are diagrammatically shown in the form of conductors 38 leading to a battery 39 and controlled by a switch 40. Suitable electrical connections, as 41, are also provided for the igniter 35.

In operation, when the motor is turned over or started by hand or by an electric starting motor, suction or depression is thereby created in the passage 15 and mixture is thereby drawn into the passage from the carburetor 12. This depression also communicates with combustion chamber 22 which causes mixture to be drawn from the carburetor 20 into said chamber. This latter mixture is immediately heated by the electric heating coil 37 and it is exploded by the igniter 35. This hot burnt gas immediately passes through the passage 25 into the intake passage 15 where it heats the gases passing therethrough from the carburetor 12. Heat is also transferred of course through the wall between the combustion chamber 22 and the passage 15 so that a mixture from the main carburetor is immediately heated to a point where it is readily ignited in the motor.

After the motor has operated for a short time the exhaust gases will have heated the exhaust pipe 11 and by-pass 23 and hot exhaust gases will then pass through the jacket 21 to thereby assist in heating the intake pipe 13 and the mixture therein. With low or nearly closed throttle 15' the combustion heater will operate at its full capacity due to the fact that there will be considerable depression in the intake pipe above the throttle and the combustion heater, therefore, will keep the intake pipe hot when it most needs it. When the throttle 15', however, is open somewhat the depression in the passage 15 will have dropped and less mixture will be drawn into the combustion chamber 22 so that less heat will be supplied to the mixture passage 15. However, the motor will now be firing heavier charges and the exhaust therefrom will be very hot so that the jacket 21 will supply considerable heat to the intake pipe 13 and the gases therein. Thus there will be approximately an equalization of temperatures in the intake passage 15 and the motor will operate at very nearly its greatest efficiency all the time.

Other forms of devices than that shown may be made without departing from the spirit or scope of the invention.

Having thus described my invention, what I claim and desire to secure by Letters Patent is:

1. A combustion heater of the type described, comprising a combustion chamber, means for feeding a combustible mixture to said chamber, an igniter in said chamber, means between the mixture inlet and said igniter for breaking up the mixture, and an electric heating coil in the chamber for heating the mixture before combustion.

2. A combustion heater of the type described, comprising a combustion chamber, means for feeding a combustible mixture to said chamber, an igniter in said chamber, means between the mixture inlet and said igniter for breaking up the mixture, and an electric heating coil arranged between the mixture intake and said latter means for heating the mixture.

3. A combustion heater of the type described, comprising a combustion chamber, means for feeding a combustible mixture to said chamber, an igniter in said chamber, means between the mixture inlet and said igniter for breaking up the mixture, and an electric heating coil for the mixture.

4. A combustion heater of the type described, comprising a combustion chamber, means for feeding a combustible mixture to said chamber, an igniter in said chamber, a screen between the mixture inlet and said igniter for breaking up the mixture, and an electric heating coil arranged between the mixture intake and said screen for heating the mixture.

5. A combustion heater comprising a chamber having an inlet at the upper end and an outlet at the lower end, an igniter intermediate the ends of the chamber, means for supplying a combustible mixture to said chamber through said inlet, a screen across the chamber below the inlet, and a heating coil between the inlet and said screen.

6. A combustion heater comprising a chamber having an inlet at the upper end and an outlet at the lower end, an igniter intermediate the ends of the chamber, means for supplying a combustible mixture to said chamber through said inlet, a screen across the chamber below said inlet, and a heating coil arranged to heat the mixture adjacent said inlet.

In testimony whereof I affix my signature.

LIONEL M. WOOLSON.